United States Patent

[11] 3,545,538

[72] Inventors Donald R. Hinnant
Rome;
C... Wilson, Cartersville, Georgia
[21] Appl. No. 816,515
[22] Filed April 16, 1969
[45] Patented Dec. 8, 1970
[73] Assignee General Electric Company
a corporation of New York

[54] SELF-SUPPORTING PARALLEL TUBULAR STRUCTURE AND METHOD OF FORMING THE SAME
5 Claims, 7 Drawing Figs.

[52] U.S. Cl. ..................................... 165/175,
165/130, 165/177; 336/57, 336/58; 29/157.3
[51] Int. Cl. .................................... F28f 9/02
[50] Field of Search ........................... 165/47,
106, 172, 173, 175, 177, 130, 162, 171; 336/55,
57, 58; 29/157.3

[56] References Cited
UNITED STATES PATENTS

| | | | |
|---|---|---|---|
| 2,086,222 | 7/1937 | Harkness | 165/177X |
| 2,417,661 | 3/1947 | Rosales | 29/157.3 |
| 3,297,081 | 1/1967 | Nunemaker | 165/162X |
| 3,441,478 | 4/1969 | Williams | 29/157.4X |

FOREIGN PATENTS

| | | | |
|---|---|---|---|
| 147,310 | 1/1904 | Germany | 165/172 |
| 1,378,716 | 10/1964 | France | 165/130 |
| 707,533 | 4/1954 | Great Britain | 165/171 |

Primary Examiner—Albert W. Davis, Jr.
Attorneys—J. Wesley, Frank L. Neuhauser and Oscar B. Waddell ABSTRACT: A plurality of heat exchanger tubes disposed in parallel planar spaced relation between spaced-apart headers are deformed into mutually supporting engagement along one or more transverse lines intermediate the ends of the tubes. By partially collapsing the tubes simultaneously between opposed linear dies a short length or region of each tube is expanded laterally in the plane of the tubes and into abutting relation with adjacent tubes. Preferably the planar expansion is sufficient to fold the abutting tubes into interlocking engagement. Constriction of the tubular cross section may be minimized or avoided by utilizing tubes of initially flattened or elliptical cross section disposed with their minor axes in the plane of the tubes, whereby lateral compression applies along the major axes substantially reverses the orientation of major and minor cross-sectional axes at the partially collapsed region of each tube.

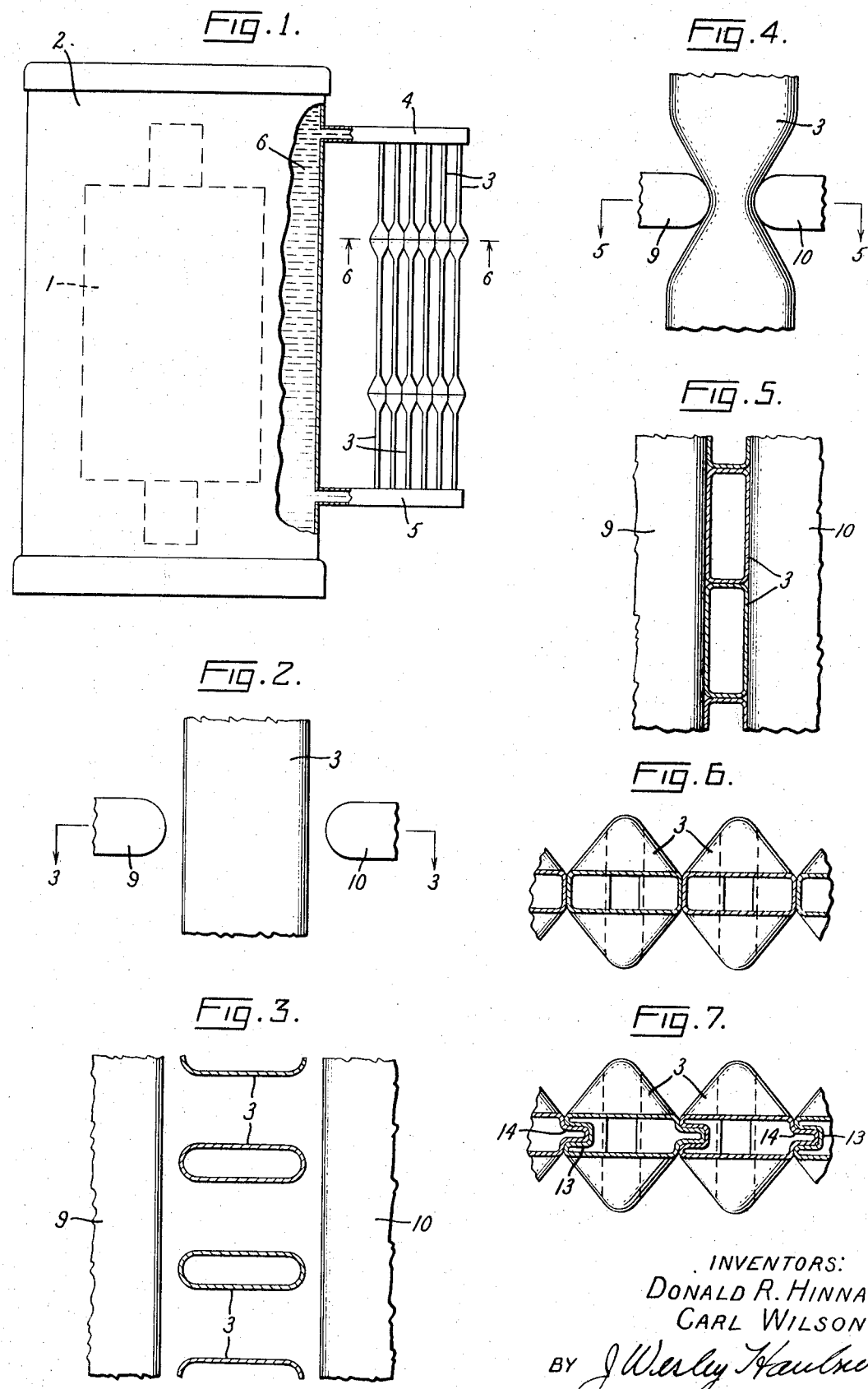

3,545,538

SELF-SUPPORTING PARALLEL TUBULAR STRUCTURE AND METHOD OF FORMING THE SAME

This invention relates generally to tubular structures, and more particularly to means for supporting and bracing intermediate their ends a plurality of relatively long tubes assembled in parallel planar a spaced relation as, for example, in heat exchangers and the like.

Parallel tube heat exchangers are frequently used in large electrical apparatus of the liquid cooled type such as electric power transformers. For example in tank-type transformers a core and assembly immersed in a dielectric liquid is cooled by passing the liquid from the tank through an external radiator formed of a plurality of relatively long tubes assembled in planar parallel spaced relation between spaced-apart headers. The overall width and height dimensions of such a planar array of radiator tubes is limited by the size and proximity of the transformer tank. In order to obtain a tube surface area as large as possible in a radiator of limited overall dimension, it is known to utilize tubes having a large length-to-diameter ratio. Such long and narrow tubes are susceptible to sag and vibration, and frequently must be braced mechanically at points immediate their ends.

Several means have been used in the past to strengthen and support parallel radiator tubes. In one arrangement, portions of each tube have been circumferentially expanded so that the enlarged portions of adjacent tubes abut one another; in another construction tubes have been welded or bolted to a common transverse supporting member. However expansion of portions of individual tubes, usually by hydroforming processes, is slow, and the wall thickness of the expanded portion is necessarily reduced thereby weakening the tube. Welding involves a process which must be carefully controlled to avoid burning through the tube walls; further, carbon content of the material of the supporting member and the tube must be carefully controlled since excessive carbon causes a loss of ductility when the material is welded with the resulting danger of weld fracture. Bolting the tubes through a common support results in a structure which by its nature is not permanent but susceptible to dislodgement, and it requires time-consuming assembly methods.

Accordingly, it is a principal object of our invention to provide new and improved means for cooperatively bracing and mutually supporting a planar array of heat exchanger tubes without the use of additional structural elements.

It is a more particular object of our invention to provide an improved planar array of spaced-apart parallel radiator tubes having transversely aligned regions intermediate their ends deformed after assembly and into cooperative mutually supporting relation, and to provide a method for effecting such bracing in a single deforming operation.

In carrying out our invention in one preferred embodiment, we form a heat exchanger as a planar array of hollow tubes extending in parallel spaced relation between spaced-apart headers at opposite ends of the tubes. Preferably each tube has a generally flattened or oval cross-sectional configuration, and the tubes are disposed in flatwise spaced-apart relation, i.e., with their major cross-sectional axes parallel and their minor axes in the plane of the tubular array. Along one or more transverse lines, preferably substantially perpendicular to the tube axes, aligned short lengths of the tubes are partially collapsed by lateral compression perpendicular to the plane of the tubes. By such compression the collapsed region of each is expanded laterally in the plane of the tube and into abutting engagement with the like region of each adjacent tube. To effect such lateral engagement between adjacent tubes the cross-sectional size and the spacing of tubes must of course be so selected that lateral engagement occurs before the tubes are fully collapsed by lateral indentation. In so deforming the tubes in the aligned regions described cross-sectional shape is changed in the deformed regions, but no appreciable change occurs in the cross-sectional peripheral length, so that no stretching or attenuation occurs in the walls of the tubes.

By continuing the degree of lateral expansion beyond the point of initial engagement adjacent tubes are caused to fold into interlocking engagement along the transverse line of partial collapse. Such partial collapse of the tubes into lateral engaging or interlocking relation along one or more transverse lines may be effected substantially simultaneously and after assembly by compressing the tubes between opposed linear dies, whereby the rigidity of the array is increased without welding, bolting or the use of additional bracing members.

By utilizing tubes having a flat or oval cross-sectional configuration marked by major and minor axes of different lengths, and disposing the tubes in generally flatwise spaced-apart relation so that the collapsing force is applied along the major axes, it is possible to effect interlocking lateral engagement without appreciably constricting the internal cross section of any tube at the point of collapse, i.e., by interchanging or reversing the orientation of major and minor cross-sectional axes of the region of deformation of each tube.

The features characteristic of our invention are particularly pointed out and distinctly claimed in the concluding portion of this specification. The invention will be more fully understood and its objects and advantages further appreciated by referring now to the following detailed description taken in conjunction with the accompanying drawings, in which:

FIG. 1 is a side elevational view, partially in section, of a liquid-filled transformer tank having a tubular external heat exchanger formed to embody our invention;

FIGS. 2 and 3 are fragmentary side elevational and plan views, respectively, of a group of parallel heat exchanger tubes in position between a pair of forming dies prior to compression between the dies;

FIGS. 4 and 5 are fragmentary side elevational plan views, respectively, of the tubes and dies of FIGS. 2 and 3 shown after the compressing or deforming of the tubes;

FIG. 6 is a fragmentary cross-sectional view of a group of deformed tubes taken along the line 6–6 of FIG. 1 and illustrating one embodiment of our invention, and FIG. 7 is a view similar to FIG. 6 but showing the tubes deformed to a greater degree to illustrate another embodiment of the invention.

Referring now to the drawing, we have shown at FIG. 1 a transformer core and coil assembly 1 disposed in an enclosing tank 2 and immersed in a dielectric liquid 6 which substantially fills the tank. A heat exchanger comprising a planar array of parallel radiator tubes 3 is connected to the tank 2 by upper and lower headers 4 and 5, respectively and filled with the dielectric liquid 6. As will be understood by those skilled in the art, when transformer core and coil assembly 1 becomes heated by the passage of current, the surrounding dielectric fluid 6 absorbs such heat and rises in the tank by convection. Meanwhile, fluid within the heat exchanger tubes 3 descends from upper header 4, transfers its heat energy to the surrounding atmosphere through the walls of the radiator tubes 3 and reenters the tank 2 through the lower header 5.

At FIGS. 2 and 3, we have shown fragmentary end and plan views of a plurality of heat exchanger tubes 3 in planar alignment. Linear or elongated forming dies 9 and 10 are positioned parallel the plane of the tubes and on opposite sides thereof along lines transverse to the tubular axes. The dies 9 and 10 are in mutually parallel spaced relation so that when brought together a short linear region of each tube is laterally indented between the dies and thus partially collapsed in a direction perpendicular to the plane of the tubes, as shown at FIG. 4.

With the several tubes partially collapsed laterally as shown in FIG. 4, it is evident that the collapsed region of each tube will be expanded laterally in the plane of the tubular array. A minimum desired degree of such expansion is illustrated at FIG. 5 where the juxtaposed sidewalls of the tubes are shown in contacting engagement but without further deformation. A cross-sectional view of several deformed tubes with the forming dies removed is shown at FIG. 6. It will be evident to those skilled in the art that the tubes so deformed are positively prevented from moving laterally in the plane of the tubular array. Deformation or bending perpendicular to the plane of the array is now resisted not only by the inherent rigidity of each tube but also by frictional contact with its neighboring tubes in the one or more transverse linear regions of lateral contact between the tubes.

A preferred embodiment of our invention is illustrated at FIG. 7. The initial steps used to form the interlocked tube assembly shown at FIG. 7 are the same as described above, in that a plurality of spaced-apart tubes in planar array are simultaneously indented, or partially collapsed, between a pair of linear forming dies until the collapsed regions of juxtaposed tubes come into lateral abutting or engaging relation. We have further discovered that by increasing the degree of indentation or collapse beyond the point of initial lateral engagement of the tubes, one of the abutting walls indents the other in what may be described as a tongue-and-groove interlocking engagement. Such an interlocking configuration is shown at FIG. 7 wherein each tube 3 is shown to have formed at one side of its collapsed region at indentation or groove 13 and at the other side thereof an interfitting tongue 14. It is our experience that tubes collapsed and interlocked in the manner described ordinarily deform in symmetrical manner is illustrated at FIG. 7, with each tube forming at one side a depression or groove and at the other a projection or tongue. Occasionally a tube will be formed with a groove at both engaging surfaces or a tongue at both engaging surfaces, but the relative disposition of these interlocking parts is of no consequence so long as an interlocking engagement is in fact formed between each adjacent pair of tubes.

It will now be observed that with the parallel tubes deformed into laterally interlocking as well as engaging relation a greatly increased degree of lateral rigidity is provided in the tubular array. Lateral deformation or bending of the tubes is positively prevented both in directions perpendicular to the plane of the array and in directions parallel to the plane of the array. Moreover the end tubes which engage only a single adjacent tube are more firmly gripped and held in position by the indented interlocking engagement than by the frictional engagement shown at FIGS. 5 and 6.

While we have shown only certain preferred embodiments of our invention by way of illustration other modifications will occur to those skilled in the art. It will therefore be understood that we intend herein to cover all such modifications as fall within the true spirit and scope of our invention.

We claim:

1. A heat exchanger comprising a planar array of tubes disposed in parallel spaced-apart relation between transverse headers, transversely aligned intermediate regions of said tubes of short axial length being deformed by opposing lateral indentations perpendicular to the plane of said array and corresponding lateral expansion in the plane of said array, said lateral expansion being at least sufficient to bring juxtaposed sides of said tubes into engagement in aligned regions, the cross-sectional periphery of each said tube in its region of deformation being substantially the same as in undeformed regions thereof.

2. The method of forming a heat exchanger according to claim 1 which comprises, aligning a pair of elongate indenting dies in opposed parallel spaced relation on opposite sides of said planar array of tubes in a direction transverse to the axes of said tubes, and simultaneously pressing said dies against opposite sides of said array to partially collapse said tubes in transversely aligned regions while expanding said tubes laterally in the plane of said array, said partial collapse and corresponding lateral expansion being continued at least until each tube comes into lateral engagement with each adjacent tube in the deformed region.

3. A heat exchanger according to claim 1 wherein laterally engaging juxtaposed sides of said tubes are folded into interlocking engaging relation in said regions of deformation.

4. A heat exchanger according to claim 1 wherein said tubes are of elongate cross-sectional configuration and are disposed flatwise in parallel spaced-apart relation with their major cross-sectional axes parallel, said deformed regions being partially collapsed along said major axes sufficiently to reverse the orientation of major and minor axes in said regions.

5. A heat exchanger according to claim 4 wherein laterally engaging juxtaposed sides of said tubes are folded into interlocking engaging relation in said regions of said deformation.